United States Patent [19]
Verhille

[11] Patent Number: 5,904,764
[45] Date of Patent: May 18, 1999

[54] CEMENTITIOUS PRODUCT AND METHOD FOR PRODUCING SAME

[75] Inventor: Marcel Verhille, Mantes-la-Ville, France

[73] Assignee: Ciments Francais, Puteaux, France

[21] Appl. No.: 08/952,301

[22] PCT Filed: May 15, 1996

[86] PCT No.: PCT/FR96/00732

§ 371 Date: Nov. 14, 1997

§ 102(e) Date: Nov. 14, 1997

[87] PCT Pub. No.: WO96/36577

PCT Pub. Date: Nov. 21, 1996

[30] Foreign Application Priority Data

May 19, 1995 [FR] France .................................. 95 05960

[51] Int. Cl.⁶ .................................................. C04B 24/12
[52] U.S. Cl. .................... 106/696; 106/727; 106/822; 106/823
[58] Field of Search ..................... 106/696, 724, 106/727, 808, 822, 823

[56] References Cited

U.S. PATENT DOCUMENTS 4,410,367  10/1983  Legrand .

FOREIGN PATENT DOCUMENTS

| | | |
|---|---|---|
| 1032563 | 6/1978 | Canada . |
| 2739865 | 4/1977 | France . |
| 24 12 352 | 10/1974 | Germany . |
| 32 38 390 | 5/1983 | Germany . |
| 57 077 060 | 5/1982 | Japan . |
| 59-232166 | 12/1984 | Japan . |
| 61-063557 | 4/1986 | Japan . |
| 63-103849 | 5/1988 | Japan . |
| 408133808 | 5/1996 | Japan . |
| 91 17126 | 10/1983 | WIPO . |

OTHER PUBLICATIONS

Baustoffindustrie Teil B., vol. 19, Jun. 1976, Verlag Bauwesen Berlin De, pp. 6–8, DR Henning O. et al: "Die Wirkung grenzflächenaktiver Zusatzmittel in der Anfangspase der Hydratation von Portlandzementen".

Action of Admixtures on Fondu cemt : Part 1. Lithm & Sodium Salts Compou Damidot et al. Adv. Cem. Research (1996), 8(31) pp. 111–119.

*Primary Examiner*—Paul Marcantoni
*Attorney, Agent, or Firm*—Sixbey, Friedman, Leedom & Ferguson; Frank P. Presta; Joseph S. Presta

[57] ABSTRACT

A cement-based product is characterized by constituting a cement and filler mixture into which is incorporated a combination of a cationic additive and an anionic additive.

20 Claims, No Drawings

CEMENTITIOUS PRODUCT AND METHOD FOR PRODUCING SAME

The object of the present invention is a novel, cement-based product and the method for producing said novel product.

It is known in the cement industry to add powder products, called fillers, to the cement powder to improve the physical and mechanical cement properties.

These products are defined, under the French standard NF P15-301 and are called "fillers" and are calcareous or siliceous products, or organic particles such as styrene butadiene or polyvinyl acetate type polymers.

Said standard P15-301 further specifies that these fillers may not be present in more than 5% by weight.

The grain sizes of the cement powders being used run from about 1 micron ($\mu$) for the finest ones to 160 microns for the coarsest ones.

The mineral fillers are composed of very fine grain sizes from 0.10 to 10 $\mu$, approximately 10 to 20% being particles less than a micron.

Organic fillers have exceedingly small dimensions down to 20 to 30 nm (20 to 30 thousandths of a micron).

The present invention relates not only to the above mentioned mineral and organic fillers, but also to the ultrafine ones, namely having diameters between 5 and 50 nm.

On the other hand, as will be elucidated below, for products having grain sizes larger than those of the above defined fillers, the critical condition is that their diameter at most be equal to that of the cement particles.

Accordingly in the discussion below, "filler" shall designate powdery, mineral or organic products having diameters ranging from 5 nm for the finest ones to 160 microns for the coarsest ones.

It is further known in the cement industry to improve or to modify the mechanical or rheological properties of a cement slurry or of mortar using so-called "additive" products.

In particular the French patent 90.05688 filed on May 4, 1990 by one of applicants describes a novel product in the form of an additive constituted of a fatty amine salt combined with a surfactant. This additive has the property of improving the casting features of a cement slurry also containing additives.

The expression "cationic additive" designates the products described in the patent 90.05688, that is comprising a fatty amine salt, a surfactant and an antifoaming agent.

The expression "anionic additive" designates a product substantially composed of an anionic polymer such as those conventionally used in the field of (non-surfactant) cement additives.

Research by applicant led to the discovery that by combination with a cationic additive and a filler offers synergy allowing to substantially increase the filler proportion in the cement while nevertheless retaining good mechanical strength.

In the prior art, using the known additives, no more than 20% of filler could be added to the cement because, beyond this proportion, the mechanical and physical properties of cement would be degraded.

On the other hand, in the present invention, by combining a cationic additive and an anionic additive, up to 1,000% filler may be incorporated, that is, 50-fold of the present upper limit.

It was found that up to 50% filler (fine and ultrafine) may be incorporated into a cement without modifying or degrading its physical, mechanical or chemical properties. Beyond the 50% proportion, some properties, in particular the mechanical properties, are degraded, however the influence of the fine and ultrafine particles achieve improved chemical resistance, especially with respect to pollution and corrosive waters.

Be it noted that the proportion of the cationic additive plus anionic additive must be adjusted not in relation to the weight of cement per se but as a function of the sum of cement+fine and ultrafine fillers.

For example,
approximately 2 g additive are required for 100 g cement and 100 g filler,
approximately 8 g additive are required for 100 g cement and 700 g filler.

In general, where the additive consists of a combination of two, namely one a cationic additive and the other an anionic additive, the additive proportion by wt must be between 0.05 and 5%.

The cationic additives are fatty acid salts such as:
an amine acetate, amine oleate, amine palmitate or amine stearate,
a propoxylated amine salt,
an ethoxylated amine salt,
an amine salt comprising a double alkylated chain, for instance dioctadecyldimethylammonium (DODA).

The anionic additives may be the following:
a sulfonated-naphthalene formaldehyde,
a lignosulfonate,
a sulfonated-melamine formaldehyde,
an acrylic copolymer,
a vinylester copolymer,
sodium carbohydrates or saccharates,
carboxylic acids.

It must be noted from the onset that for an expert, such combination of cationic additive and anionic additive is impossible because the cationic additive is water-insoluble, hydrophobic and positively charged, whereas the anionic additive is water soluble, hydrophilic and negatively charged.

It was found that in most cases first the cationic agent must be admixed to the filler in such manner that the filler particles shall be coated by the cationic agent, whereupon the cement was mixed with the filler thusly coated then water was added, to be followed by overall mixing, and that the anionic additive would be added only at the end of overall mixing.

When the filler proportion relative to the cement is very large, that is 300% or even 1,000%, the anionic additive may be added after the cement at the very beginning of overall mixing, however preferably it shall be added at the end of overall mixing.

The cationic additive is considered evincing high affinity for the filler and the anionic additive evincing good affinity for the cement.

Various tests were run on substituting filler for cement, it being borne in mind that the expression "filler" covers both ultrafine and fine particles, with the condition that the filler particles must have a diameter equal to or less than that of the cement particles.

The test results are shown in the following Tables, wherein:
the "cationic formulation" consists of a mixture of one part INIPOL 002 and two parts NP6 (nonylphenol with 6 ethylene oxides), an antifoaming agent such AIR-PLAST 251 being added, the anionic additive is a sulfonated-naphthalene formaldehyde the weight of the cement plus filler is the same for a given series of tests, quantity of water being adjusted to assure satisfactory spreading (flowing), the density is measured in kg per cubic decimeter, compressive strength is measured after 1 day, 2 days, 7 days and 28 days depending on application, the spreading is conventionally measured by the so-called flow test following filling a frustoconical receptacle having a base diameter of 100 mm, a top diameter of 70 mm and a height of 50 mm; this frustoconical volume is deposited on a metal plate and is filled with the product to be tested up to its upper level, the receptacle being lifted and the product being let to spread and the maximum spreading being measured.

In all these tests, moreover, an antifoaming agent was added to the cationic additive, and the filler either is a calcareous filler or a siliceous filler or an organic filler such as an anionic polymer (latex).

TEST SERIES I

This first test series comprises four tests on a cement slurry comprising 1,500 g of product in equal proportions of cement and filler (750 g each). The filler is calcareous.

The first column (test I-1) relates to a test using only one of two additives, namely the anionic additive, the cationic one being absent.

The second column (test I-2) relates to an opposite test with only the cationic additive, the anionic one being absent.

The third and fourth columns (I-3 and I-4) relate to two tests with the two combined additives in different proportions.

TEST SERIES I (cement-filler ration = 1/1)

|  | 1 | 2 | 3 | 4 |
|---|---|---|---|---|
| Cationic additive |  | 15 | 7.5 | 9 |
| Anionic additive | 15 |  | 7.5 (added at the end of overall mixing) | 6 (added at the end of overall mixing) |
| Water | 410 | 250 | 250 | 250 |
| Cement | 750 | 750 | 750 | 750 |
| Calcareous filler | 750 | 750 | 750 | 750 |
| Flow test (spread) (mm) | 170 | 135 | 180 | 210 |
| Density (kg/dm$^3$) | 2.00 | 1.91 | 2.13 | 2.17 |
| Compressive strength (Mpa) |  |  |  |  |
| 1 day | 22 | 20 | 15 | 30 |
| 2 days | 28 | 33 | 49 | 56 |
| 7 days | 41 | 48 | 70 | 80 |
| 28 days | 61 | 63 | 84 | 96 |

It is clear from these results that when 50% filler is used, compressive strength is low, a feature known per se, and that using only an anionic additive as in test I-1, or only a cationic additive as in test I-2, will be ineffectual.

On the other hand test I-3 shows a much higher compressive strength starting the second day and test I-4 shows even more pronounced improvement. In both instances the cationic additive is admixed first to the filler, the anionic additive being added only at the end of overall mixing.

Synergy due to combining a cationic additive and an anionic additive in the presence of a filler thus is demonstrated.

TEST SERIES II

This second test series is similar to the first one and also comprises four tests relating to a cement slurry of 1,500 g of a mixture of cement plus filler, however in this instance the filler proportion relative to cement is 300% (375 g cement and 1,125 g filler). The filler is calcareous.

TEST SERIES II (cement/filler ratio = 1/3)

|  | 1 | 2 | 3 | 4 |
|---|---|---|---|---|
| Cationic additive |  | 15 | 7.5 | 12 |
| Anionic additive | 15 |  | 7.5 | 3 |
| Water | 340 | 240 | 240 | 240 |
| Cement | 375 | 375 | 375 | 375 |
| Calcareous filler | 1,125 | 1,125 | 1,125 | 1,125 |
| Flow test (spread) (mm) | 145 | 170 | 145 | 220 |
| Density (kg/dm$^3$) | 1.78 | 2.01 | 2.13 | 2.07 |
| Compressive strength (Mpa) |  |  |  |  |
| 1 day | 4 | 6 | 16 | 14 |
| 2 days | 9 | 19 | 32 | 26 |
| 7 days | 17 | 31 | 44 | 39 |
| 28 days | 22 | 40 | 56 | 50 |

Tests II-1, II-2 and II-3 correspond to tests I-1, I-2 and I-3 resp. The proportion of cationic additive relative to the anionic additive was increased in Test II-4.

Again synergy is clear; compressive strength is low in all instances, however it is substantially improved in tests II-3 and II-4 while the slurry comprises 300% filler, which is remarkable because in the prior art the limit is merely 20%.

TEST SERIES III

This third test series is similar to the former two. It comprises only three tests corresponding to tests I-1, I-2, II-2, the third test II-3 corresponding to test II-4.

TEST SERIES III (cement/filler ratio = 1/10)

|  | 1 | 2 | 3 |
|---|---|---|---|
| Cationic additive |  | 15 | 12 |
| Anionic additive | 15 |  | 3 |
| Water | 330 | 250 | 250 |
| Cement | 136 | 136 | 136 |
| Calcareous filler | 1,364 | 1,364 | 1,364 |
| Flow test (spread) (mm) | 155 | 160 | 200 |
| Density (kg/dm$^3$) | 1.80 | 1.91 | 2.07 |
| Compressive strength (Mpa) |  |  |  |
| 1 day | 0 | 1 | 1.5 |
| 2 days | 1 | 2 | 4 |
| 7 days | 3 | 4 | 8 |
| 28 days | 4 | 6 | 12 |

Again synergy is clearly shown.

Compressive strength is practically null on the first day; on the second day, the compressive strength of test III-3 is double and quadruple resp. that of the tests III-1 and III-2.

Compressive strength on the 18th day is 12 Mpa in test II-3, being only 4 and 6 Mpa in the two other tests.

Be it noted that this strength of 12 Mpa is needed by sculptors or restorers who use what is called "reconstituted stone", offering the dual advantage of economy because of lesser cement and higher weather resistance.

TEST SERIES IV

This fourth series of tests relates to mortars, that is to a mixture of cement and sand wherein the cement per se contains 50% filler.

The first column is that of the conventionally produced control product.

| TEST SERIES IV (cement/filler ratio = 1/1) | | | | |
|---|---|---|---|---|
| | Control | 1 | 2 | 3 |
| Cationic additive | | | 6.9 | 6 |
| Anionic additive | | 6.9 | | 0.9 added at end of overall mixing |
| Water | 225 | 170 | 100 | 100 |
| Cement | 450 | 225 | 225 | 225 |
| Standardized sand | 1,350 | 1,350 | 1,350 | 1,350 |
| Siliceous filler | | 225 | 225 | 225 |
| Flow test (spread) (mm) | 145 | 130 | 140 | 130 |
| Density (kg/dm$^3$) | 2.21 | 2.23 | 2.25 | 2.27 |
| Compressive strength (Mpa) | | | | |
| 1 day | 13 | 8 | 6 | 28 |
| 2 days | 25 | 20 | 30 | 41 |
| 7 days | 40 | 33 | 45 | 51 |
| 28 days | 58 | 38 | 57 | 64 |

By checking the results of this table, the spread, density and compressive strength test values are substantially the same as for the tests IV-1 and IV-2 and for the control; on the other hand test IV-3 shows significant improvement of compressive strength and thereby illustrates the synergy of combining the two additives.

In order that the two tests be comparable, 6.9 g of additive were used in all cases, namely 6.9 g of anionic additive in the test IV-1, 6.9 g of cationic additive in test IV-2, 6 g of one and 0.9 g of the other in test IV-3.

In this series of tests, the filler no longer is calcareous. It was found necessary when using a siliceous filler to substantially increase the proportion of cationic additive to achieve good, prior cladding of the filler particles, and said increase entailed that the anionic additive was introduced only at the end of overall mixing.

Accordingly the above test series show that by combining a cationic additive with an anionic additive, dual objectives are achieved, namely much larger quantities of filler can be incorporated into a cement and moreover synergy is obtained regarding the mechanical strength of the slurry or mortar so prepared.

The following Table shows that a third advantage is also obtained, which is closely linked to the former two, namely that, in very surprising manner, the synergy increases as the filler proportion increases.

In said Table, Ra denotes the mechanical strength due to the anionic additive; Rc denotes the mechanical strength due to the cationic additive, Rm denotes the mean, and Rs denotes the synergy effect due to combining both additives.

As shown not only will Rs always be larger than Rm, but the gap between Rs and Rm increases as the filler proportion increases.

| Summary Table of Cement/Filler Behavior Compressive strength after 7 days | | | |
|---|---|---|---|
| Cement/filler | 75/25 | 50/50 | 25/75 |
| Anionic additive (Ra) | 69 | 41 | 16 |
| Cationic additive (Rc | 73 | 48 | 32 |
| Mean (Rm = ½[Ra + Rc]) | 71 | 44.5 | 24 |
| Anionic + cationic additives (Rs) | 100 | 70 | 44 |

Be it noted that the cationic additive can be incorporated at the time the clinker is being ground when making the cement. In such a case the cationic additive acts a comminuting agent.

I claim:

1. A cement product, comprising:
   a mixture of cement and a powdery filler, the particles of which having a diameter equal to or less than that of the cement particles mixture, to which is added a combination of an anionic additive and a cationic additive, said cationic additive comprising a fatty amine salt.

2. Product as claimed in claim 1, wherein the filler proportion relative to the cement exceeds 20%.

3. Product as claimed in claim 2, wherein the filler proportion relative to the cement is between 20% and 1,000%.

4. Product as claimed in claim 1, wherein the filler is a powdery, mineral or organic product, the particles of which have a diameter between 5 mn and 160 μm, the coarsest particles being required to have a diameter equal to or less than that of the cement particles.

5. Product as claimed in claim 1, wherein said cationic additive comprises a fatty amine salt selected from the group consisting of:
   an amine stearate, palmitate, oleate or acetate,
   a propoxylated amine salt,
   an ethoxylated amine salt,
   an amine salt comprising a double alkylated chain.

6. Product as claimed in claim 1, wherein the anionic additive is selected from the group consisting of:
   a sulfonated-naphthalene formaldehyde
   a lignosulfonate,
   a sulfonated-melamine formaldehyde,
   an acrylic copolymer,
   a vinylester copolymer,
   sodium carbohydrates or saccharate,
   carboxylic acids.

7. Product as claimed in claim 1, wherein the proportion by weight of the combination of said cationic additive and anionic additive is between 0.05% and 5% of the sum of said cement and filler.

8. Product as claimed in claim 1, wherein the antifoaming agent is advantageously admixed with the cationic additive.

9. Product as claimed in claim 1, wherein the filler is calcareous.

10. Product as claimed in claim 1, wherein the filler is siliceous.

11. Product as claimed in claim 1, wherein the filler is an anionic polymer.

12. Product as claimed in claim 9, being a slurry comprising:
   50% cement,
   50% calcareous filler,
   16.66% water of the total weight of cement and filler,
   0.5% cationic filler of the total weight of cement and filler,
   0.5% anionic additive of the total weight of cement and filler.

13. Product as claimed in claim 9, being a slurry comprising:
   50% cement,
   50% calcareous filler,
   16.66% water of the total weight of cement and filler,
   0.6% cationic additive of the total weight of cement and filler,
   0.4% anionic filler of the total weight of cement and filler.

14. Product as claimed in claim 9, being a slurry comprising:

25% cement,

75% calcareous filler,

16% water of the total weight of cement and filler, 0.5% cationic additive of the total weight of cement and filler, 0.5% anionic additive of the total weight of cement and filler.

15. Product as claimed in claim 9, being a slurry comprising:

25% cement,

75% filler,

16% water of the total weight of cement and filler, 0.8% cationic additive of the total weight of cement and filler, 0.2% anionic additive of the total weight of cement and filler.

16. Product as claimed in claim 9, being a slurry comprising:

9% cement,

90% filler, 16.6% water of the total weight of cement and filler, 0.8% cationic additive of the total weight of cement and filler, 0.2% anionic additive of the total weight of cement and filler.

17. Product as claimed in claim 10, being sand mortar comprising:

12.5% cement, 12.5% filler, sand 75%, 5.5% water, 0.3% cationic additive, 0.05% anionic additive, where said percentage are relative to the total weight of cement and filler and sand.

18. A method for making the product as claimed in claim 1 comprising cement, filler, a cationic additive including a fatty amine salt and an anionic additive, wherein first the cationic additive is admixed with the filler to coat the filler particles in said cationic additive, then the filler so coated is mixed with the cement, next water is added to begin overall mixing and lastly the anionic additive is added at the end of overall mixing.

19. Method for making the product as claimed in claim 1 comprising cement, filler, a cationic additive and an anionic additive where in the cationic additive is incorporated at the time of clinker grinding during cement manufacture.

20. Method as claimed in claim 19, wherein the cationic additive acts as a comminuting agent.

* * * * *